Patented Apr. 29, 1952

2,594,375

UNITED STATES PATENT OFFICE 2,594,375

INHERENTLY PROCESSABLE INTERPOLYMERS OF VINYL CHLORIDE, A HIGHER ALKYL ACRYLATE, AND A MONO-ISO-OLEFIN

Robert J. Wolf, Cleveland, Ohio, assignor to The B. F. Goodrich Company, New York, N. Y., a corporation of New York No Drawing. Application February 1, 1950, Serial No. 141,861

5 Claims. (Cl. 260—80.5)

The present invention relates to interpolymers obtained by the polymerization of monomeric mixtures containing at least three monomeric components, each in particular proportions, one of which is vinyl chloride, another of which is a higher alkyl acrylate such as an octyl acrylate, and the third of which is a mono-isoolefin such as isobutene, which interpolymers possess various new and unique properties, especially in regard to their softness, low softening points, clarity and ease of processing combined with excellent strength, and their remarkable ability to remain strong and flexible upon exposure to a wide range of temperatures; and it pertains particularly to three-component interpolymers or tripolymers of these three types of monomeric materials which are so inherently processable as to be processed and made into excellent films, sheets, rods, tubes and plates without the use of plasticizers and which have softening points sufficiently low as to be utilized in solid or latex form for the production of films, coatings, and impregnated articles having remarkable clarity and transparence, without exposing the polymer to excessively high temperatures during manufacturing operations.

Vinyl resins such as polyvinyl chloride and copolymers of vinyl chloride with various other monomeric materials such as vinylidene chloride, vinyl acetate, methyl acrylate and diethyl fumarate are well known to the art and are widely used in many familiar applications. It is usually the practice in using such resins to first mix the thermoplastic resin, which itself is normally too hard and horny to be easily subjected to milling, calendering, and extruding, with a considerable amount of liquid plasticizing materials such as the estertype plasticizers like di-2-ethylhexyl phthalate, dibutyl phthalate, and tricresyl phosphate, to obtain a plasticized composition which is sufficiently soft and plastic as to be easily processed and worked into the desired shape and which will possess the properties of softness and flexibility not found in the resin itself. Copolymers of vinyl chloride with isobutene are also known, but these, even when plasticized with ester-type plasticizers, possess such low elongation and brittleness that they have not been used extensively.

There are a number of disadvantages attending the use of liquid plasticizers, which until now have greatly limited the use of all vinyl resins. The plasticizers commonly employed are oily, liquid materials which, even though thoroughly mixed with the vinyl resin and the resulting composition subjected to heating and mechanical working in order to insure an intimate combination of resin and plasticizer, have a tendency to "bleed" or migrate to the surface of the composition, where they are lost through wiping, washing or volatilization with the inevitable result that the composition gradually stiffens and hardens and consequently fails by tearing, cracking, etc. Under exposure to hot soapy water such as is normally encountered by plastic shower curtains, tablecloths, baby pants and the like, the oily plasticizer is extracted at a greatly accelerated rate such that the composition becomes stiffened and cracked and torn in an unduly short time. Moreover, it is difficult to achieve a lasting adhesive bond between the surface of a plasticized vinyl resin composition and some other type of surface because the oily plasticizer migrates to the adhesive layer and softens the adhesive with consequent destruction of the bond. Varnished or lacquered surfaces are also marred on prolonged contact with an article of plasticized vinyl resin because of migration of the plasticizer, which also is a softener for varnish and lacquer resins, present therein. A further disadvantage is that the oily plasticizing materials must normally be incorporated into the vinyl resin on heavy expensive machinery in a costly and time-consuming milling or mixture operation.

It is a primary object of this invention, therefore, to provide a new class of vinyl resins each member of which is possessed of many of the desirable properties possessed by known vinyl resins and plasticized vinyl resin compositions but which is so inherently processable that the addition of plasticizers is not required either for processing or for desirable properties of softness and flexibility in the final product and which on that account is capable of being employed to produce articles which are more durable, serviceable and otherwise desirable. Another object is to provide a vinyl plastic which is not subject to loss of plasticity by volatilization, bleeding or extraction of plasticizer. It is also an object to provide a new class of vinyl chloride isobutene interpolymers each member of which, without plasticizer, has improved softness and flexibility and superior clarity and transparency coupled with improved resistance to discoloration by the effects of light and heat, and the ability to be fabricated at lower temperatures, thereby to be more useful over a wider range of temperatures and conditions, than conventional plasticized vinyl resin compositions. The attainment of these and still other objects will become apparent in the description of the invention which is to follow.

I have discovered that by polymerizing, preferably in an aqueous medium, monomeric mixtures containing at least three components, each in definite proportions, one being vinyl chloride, another a higher alkyl ester of acrylic acid (hereinafter defined), and the third a mono-isoolefin such as isobutene, I am able to obtain novel interpolymers having the properties necessary for achieving the above and other objectives.

While the relative proportions of the three types of monomers which are employed in the production of my interpolymers are somewhat critical, since the desired properties are not secured with these monomers in any proportion, the precise proportions may vary within certain limits. I have found it necessary to employ in the monomeric mixture from 35 to 90% by weight of vinyl chloride, from 5 to 60% of higher alkyl acrylate, and from 2 to 50% by weight of mono-isoolefin, with at least 90% by weight of the entire monomeric mixture made up of such ingredients. Particularly valuable are the tripolymers made from three-component monomeric mixtures containing from 45 to 85% vinyl chloride, from 10 to 50% by weight of the higher alkyl acrylate and from 2 to 30% of isobutene.

The higher alkyl acrylates which are employed in this invention are those alkyl esters of acrylic acid in which the alkyl group contains a chain of from 5 to 10 carbon atoms. I have found that the degree of plasticity or inherent processability imparted to my new interpolymers by these higher alkyl acrylates seems to be related somewhat to the length and configuration of the alkyl group in the alkyl acrylate and that this finding is roughly correlative with the observed degree of plasticization imparted to ordinary vinyl resins by extraneous addition of ester-type plasticizers containing similar alkyl groups. For example, di-2-ethylhexyl phthalate is an excellent plasticizer for vinyl chloride polymers and 2-ethylhexyl acrylate has been found to impart a high degree of inherent processability and softness, flexibility, and extensibility to its interpolymers with vinyl chloride and isobutene. Illustrative higher alkyl acrylates within the above class utilizable in this invention include n-amyl acrylate, n-hexyl acrylate, isohexyl acrylate, isoheptyl acrylate, n-heptyl acrylate, capryl acrylate (1-methylheptyl acrylate), n-octyl acrylate, isooctyl acrylates such as 6-methylheptyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 atoms. Compounds within this class are 6-methylheptyl acrylate, 3,5,5-trimethylhexyl acrylate, 2-ethylhexyl acrylate, 1-methylheptyl acrylate, n-octyl acrylate and others. The higher alkyl acrylates of this class have been found to impart the greatest ease of processing and greatest softness and flexibility to my new interpolymers, the most efficient acrylate in this respect being n-octyl acrylate.

Isobutene (or isobutylene as it is commonly named) is the monoisoolefin ordinarily and preferably used in this invention for interpolymerization with vinyl chloride and the higher alkyl acrylates, but other aliphatic monoisoolefins such as 2-methyl-butene-1, 2-ethyl-butene-1, 3-methyl-butene-1, etc. are substantially equivalent to isobutene in the interpolymerization described herein and may be substituted therefore in whole or in part. Generally, it is desirable that the isoolefin contain less than 8 carbon atoms and more preferably not more than 6 carbon atoms.

The polymerization of my new interpolymers may be carried out in any conventional manner although polymerization in an aqueous emulsion, which may or may not contain an added emulsifying agent, is of course essential when a stable interpolymer dispersion or latex is the desired end-product. My interpolymers may also be prepared by polymerization in the aqueous suspension or "pearl" type method whereby the monomeric materials are suspended in an aqueous medium with the aid of a colloidal protective material such as gelatin, bentonite clay, polyvinyl alcohol, polyacrylic acid, a water-soluble phenol-aldehyde or urea-aldehyde resin and others. In addition to the above methods, which are preferred, the mixture of monomers may be polymerized in a suitable solvent, in which event the polymer is obtained either as a granular precipitate or as a solution of polymer depending on the choice of solvent. The polymerization may also be carried out in the absence of a solvent or diluent to yield a solid mass of interpolymer.

Whatever method of polymerization is employed a catalyst is generally required. Any of the catalysts commonly employed for the polymerization of vinyl and vinylidene compounds may be employed. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate, sodium perborate, sodium percarbonate and others.

The above class of oxidizing catalysts are greatly activated when used in combination with a reducing substance such as sodium sulfite or resorcinol or the like in what is commonly referred to as a "redox" polymerization; hence it is often preferable to carry out the polymerization in the presence of a "redox" catalyst. Both the oxidizing and "redox" catalysts reach their fullest activity when used in combination with a small amount of a heavy metal salt such as silver nitrate, copper sulfate, ferric and cobalt compounds and many others.

In some instances it may be desirable to control or adjust the hydrogen ion concentration of the polymerization mixture, which tends to become more acid because of liberation of HCl during the polymerization. It is preferred in such cases that a buffering substance such as sodium bicarbonate, sodium carbonate, disodium phosphate ($Na_2HpO_4$), trisodium phosphate, ammonium hydroxide, sodium hydroxide, the amino-substituted alcohols such as 2-amino-2-methyl-1-propanol or the like be added to the reaction mixture.

When the monomeric mixture is polymerized in aqueous emulsion a wide variety of dispersing or emulsifying agents may be used. Suitable materials are, for example, ordinary soaps such as sodium oleate, potassium palmitate, sodium myristate, ethanol-amine laurate, and rosin or dehydrogenated rosin soaps; synthetic saponaceous materials (which are preferred) such as the salts of alkaryl sulfonic acids, or of acid sulfuric esters of long chain alcohols such as sodium isopropyl naphthalene sulfonate, sodium lauryl sulfate, the salts of sulfonated petroleum fractions, and the like.

While the polymerization may be carried out in the presence of air or oxygen, the rate of reaction is ordinarily faster in an atmosphere substantially free of oxygen or air and hence polymerization in an evacuated vessel or under an inert atmosphere is preferred. The temperature at which the reaction is carried out is not critical, it may be varied widely from −30° C. to 100° C. or higher, though best results are generally obtained at a temperature of about 0° C. to about 70° C.

In order to minimize variation in the rate of reaction and to maintain a given proportion of each of the 3 monomers in the reaction mixture throughout the reaction (and thereby improve the homogeneity of the product), it may be desirable to withhold a portion or all of one or more of the more rapidly polymerziable monomers and add the withheld portion in small increments or continuously over the course of the reaction. Since the three monomers in the pure state evidence little tendency to spontaneously interpolymerize, the monomers may be premixed and added to the reaction in increments or continuously over the reaction period. Since the concentration of the emulsifier and catalyst affects the initiation and/or growth of latex particles, careful incremental or continuous addition of emulsifier and catalyst are advantageously employed to produce a polymer latex having a predetermined particle size distribution while if the concentration of emulsifier in the reaction mixture is carefully controlled at all times at an amount somewhat less than that required to provide a monomolecular layer of emulsifier on the latex particles, the initiation of new particles may be suppressed and growth of larger more uniform latex particles will be favored. By these methods a latex of the interpolymers is made having the high fluidity and high total solids content (over 50%) greatly desired in a latex for use as such in coating, dipping and impregnating processes and in the production of unsupported films by the latex casting process.

The preparation of my interpolymers, their properties, and representative uses will be more clearly described in the following specific examples which are intended merely as illustrations of the nature of my invention and not as limitations on the scope thereof.

Example 1

A tripolymer was made by polymerizing at 20° C. the monomeric materials contained in a reaction mixture having the following proportions:

| Material: | Parts/Wt. |
|---|---|
| Vinyl chloride | 85.0 |
| 2-ethylhexyl acrylate | 10.0 |
| Isobutene | 5.0 |
| Emulsifier[1] | 4.0 |
| Potassium persulfate | 1.4 |
| Sodium sulfite (anhyd) | 0.7 |
| Water | 150.0 |

[1] A sodium salt of a sulfonated petroleum oil fraction known commercially as "Duponol 189S."

The water, emulsifier and potassium persulfate were first added to the reactor, the reactor sealed and evacuated, and the remaining materials added. The reaction was substantially complete in 17 hours with the production of an excellent medium particle size latex containing 39% total solids by weight. The latex was frozen to obtain the tripolymer in granular form. The dried tripolymer could be milled on a cool mill (180° F.) without the addition of plasticizers to form a flexible, completely colorless sheet.

Example 2

A tripolymer was similarly prepared by polymerizing at 55° C. the monomeric materials contained in a reaction mixture having the following proportions:

| Material: | Parts/Wt. |
|---|---|
| Vinyl chloride | 80.0 |
| 2-ethylhexyl acrylate | 15.0 |
| Isobutene | 5.0 |
| Emulsifier (same as Ex. 1) | 4.0 |
| Potassium persulfate | 1.5 |
| Distilled water | 94.5 |

In this example the water, emulsifier, and catalyst were added initially, the reactor sealed and evacuated, and the monomers injected under pressure. The reaction was substantially complete in 12 hours and 20 minutes with the production of an excellent, white, medium particle size latex containing 49.1% by weight total solids and having a pH of 2.0. The tripolymer derived from the latex was somewhat softer than the tripolymer of Example 1 and was found to band smoothly on a two-roll plastic mill having its rolls maintained at 175° F. The resultant milled sheet was very smooth, exhibited good body, and was clear and transparent.

The stability of the tripolymer of Example 2 upon exposure to heat was compared to that of a high grade commerical plasticized polyvinyl chloride in a test which consisted of dissolving each polymer in a solvent, coating a clean glass microscope slide with the solution and drying the resultant coating. The light transmitted through the coated portion of the slide before and after heating for 24 hours at 175° C. was measured and the values compared. The per cent light transmission after exposure (hereinafter referred to simply as "heat stability") of the tripolymer was 73.8%. The per cent light transmission after such a treatment of the plasticized polyvinyl chloride was only 50%.

The resistance of the tripolymers prepared in Examples 1 and 2 to the effects of heat can be shown in still another manner. Upon prolonged exposure to an elevated temperature, for example, for 168 hours (7 days) at 100° C. in an air oven, a plasticized vinyl resin composition suffers a loss in weight due to plasticizer volatilization, chemical breakdown or both and a permanent decrease in tensile strength and modulus and sometimes either a large increase or decrease in elongation. After such a test the tripolymers of Examples 1 and 2 when stabilized by addition of 2½% by weight on the resin of a stabilizer consisting of the mixed cadmium salts of fatty acids and naphthenic acids showed a zero loss in weight and no change in tensile strength, elongation or modulus at 100% elongation. A composition of a commercial grade of polyvinyl chloride containing the same amounts of the stabilizer and plasticized with 35 parts per 100 parts of resin of di-2-ethylhexyl phthalate, was found, after such a heat treatment, to suffer a 5 to 10% loss in weight, up to 100% decrease in elongation and a 30% decrease in modulus at 100% elongation.

Example 3

A reaction mixture was prepared having the following proportions:

| Material: | Parts/Wt. |
|---|---|
| Vinyl chloride | 80.0 |
| 2-ethylhexyl acrylate | 10.0 |
| Isobutene | 10.0 |
| Emulsifier (same as Exs. 1 and 2) | 4.0 |
| Potassium persulfate | 1.5 |
| Distilled Water | 94.5 |

The reaction was carried out at 55° C. in a manner similar to that of Example 2 and was complete in 22 hours with the production of an excellent medium particle size latex having a clear, white color and containing 50.8% total solids.

A sample of the tripolymer latex of Example 3 was coagulated, the coagulum dried and the dried coagulum milled on a cool mill (175° F.) without plasticizer. The tripolymer banded smoothly on the mill and evidenced good body and gave every evidence of fusing very readily during milling. A disc of the plasticizer-free tripolymer press-molded for one minute at 300° F. was smooth and waxy in appearance. The heat stability of this tripolymer was 70% and it was substantially colorless after heating for 24 hours at 175° C. The stability of this tripolymer to the effects of light was determined by exposing a tripolymer-coated microscope slide for four hours to the effects of a powerful mercury vapor ultraviolet lamp. The percent light transmission (hereinafter referred to as light stability in percent) was 83% after test. A sample of high grade commercial plasticized polyvinyl chloride has a light stability by such a test of only 60%.

Example 4

A tripolymer was prepared by the polymerization at 18° C. of the nonomeric materials contained in a reaction mixture having the following proportions:

| Material: | Parts/Wt. |
|---|---|
| Vinyl chloride | 70.0 |
| 2-ethylhexyl acrylate | 25.0 |
| Isobutene | 5.0 |
| Emulsifier (same as Ex. 1) | 4.0 |
| Potassium persulfate | 1.2 |
| Sodium sulfite | 0.6 |
| Water (distilled) | 150.0 |

The reaction was substantially complete in 23½ hours with the production of a very foamy white latex containing 32% total solids. A portion of the latex was spray dried at 150° C. The resulting resin powder was very fine and free-flowing in nature. The powder was compacted into a smooth, colorless sheet on a two-roll plastic mill having its rolls maintained at 175 to 200° F. or lower while by contrast the milling of polyvinyl chloride pasticized with 35 parts/100 of resin of di-2-ethylhexyl phthalate requires mill roll temperatures of 280 to 300° F. The powder was also fed directly into the screw chamber of an extrusion machine to produce an excellent colorless extruded article, the screw of the machine being unheated, the back cylinder temperature being only 200° F. and the die-tip being maintained at only 210° F. Plasticized polyvinyl chloride of a similar hardness requires temperatures of 340 to 390° F. or above in the extrusion operation. The milled tripolymer when transferred directly to a four roll calender having all four rolls maintained at only 240 to 250° F. formed a uniform colorless film of 5 to 10 mils thickness. Polyvinyl chloride plasticized to a similar hardness requires calender roll temperatures of 350° F. to form a film 5 mils in thickness.

A sample of the tripolymer was press-molded for 3 minutes at 300° F. in a standard tensile strip mold. The hardness of the tensile strip was 70 (durometer C at 30° C.), its tensile strength was 1500 lbs./sq. in., its elongation 310%, its modulus at 100% was 1100 lbs./sq. in., and its A. S. T. M. brittleness temperature was −30° F.

In a similar manner the polymerization at 18° C. of a monomeric mixture consisting of 70% vinyl chloride, 20% 2-ethylhexyl acrylate and 10% of isobutene produced a tripolymer having a hardness of 65 "C" durometer and other similar properties.

Example 5

Tripolymers were prepared by the polymerization at 18° C. in the manner of Example 4 of (1) a monomeric mixture consisting of 55% by weight of vinyl chloride, 40% 2-ethylhexyl acrylate, and 5% isobutene and (2) a monomeric mixture consisting of 55% vinyl chloride, 40% isononyl acrylate, and 5% isobutene. The first was a very soft material which fused readily when molded to form a smooth, colorless, waxy-appearing disc evidencing slight tack. The second was a slightly harder material which was tack-free but which also fused readily during molding to form a smooth, clear, colorless disc. Both tripolymers were found to be capable of being milled, extruded and calendered at low temperatures without plasticizer. The tripolymer latices were all capable of being coated on a smooth glass surface to form a smooth, clear film which required heating for only 2 minutes at 100° C. to be completely fused and strong.

Example 6

Tripolymers were prepared by the polymerization at 55° C. of (1) a monomeric mixture consisting of 65% by weight of vinyl chloride, 15% by weight of 2-ethylhexyl acrylate, and 20% by weight of isobutene, (2) a monomeric mixture of similar proportions but containing isooctyl acrylate (6-methylheptyl acrylate) instead of 2-ethylhexyl acrylate and (3) a monomeric mixture containing 45% by weight of vinyl chloride, 25% 2-ethylhexyl acrylate and 30% by weight of isobutene. The recipe employed was as follows:

| Material: | Parts/Wt. |
|---|---|
| Monomers, to total | 100.0 |
| Emulsifier (same as Ex. 1) | 4.0 |
| NH₃ (added as NH₄OH) | 0.2 |
| Potassium persulfate | 1.2 |
| Water (distilled) | 235.0 |

In each case the reaction was complete in about 40 to 45 hours with the production of latices containing 30% total solids. All three tripolymers were very soft, easily processable materials, the isooctyl acrylate tripolymer being just slightly harder than the 15% 2-ethylhexyl acrylate tripolymer. However, all three were exceedingly flexible materials such that films could be cast directly from the latex, air dried and then heated for 2 minutes at 100° C. for fusion. Films only 4 mils in thickness, were colorless, limp and had good drape. After thickening with 1 to 2% of a thickening agent such as carboxyethyl cellulose the tripolymer latices of this example were coated on heavy paper to form a coating 0.3 mil in thickness which was tough, adherent and nearly water-white in color. The 45/25/30 tripolymer was a very tacky material especially adapted to use in adhesives.

*Example 7*

The preceding examples have dealt with three-component polymers or tripolymers. According to this invention other interpolymers may be prepared from monomeric mixtures containing four or more components. A tetrapolymer was prepared by the polymerization of the monomeric materials contained in a reaction mixture having the following proportions:

| Materials: | Parts/Wt. |
|---|---|
| Vinyl chloride | 83.0 |
| Vinyl acetate | 10.0 |
| 2-ethylhexyl acrylate | 5.0 |
| Isobutene | 2.0 |
| Amberlite[1] W-1 | 1.0 |
| Potassium persulfate | 1.3 |
| Water | 400.0 |

[1] Used as a suspension agent—a water-soluble phenol-formaldehyde condensation product.

The reaction was complete in 13 hours at 50° C. The product was a fine granular polymer, the individual grains being pearl-like in appearance. The granular polymer was found to be capable of being milled, molded and extruded at temperatures of 175 to 200° F. without addition of plasticizer to form excellent sheets, rods and tubes.

Similar results are obtained when n-amyl, capryl, n-octyl, isooctyl and isononyl acrylates and other higher alkyl acrylates are substituted for the 2-ethylhexyl acrylate in the monomeric mixture of Example 7. In addition, the substitution of up to 10 parts of methyl acrylate, acrylonitrile, vinyl benzoate, diethyl maleate, vinylidene chloride and other monomeric materials for the vinyl acetate utilized in the production of the tetrapolymer of Example 7 produces similar results.

While the invention has been described with particular reference to certain preferred embodiments thereof, it is possible to make variations and modifications therein without departing from the spirit and scope of the invention as defined in the appended claims.

I claim:

1. An interpolymer made by polymerizing in aqueous emulsion a mixture of monomeric materials consisting of from 45 to 85% by weight of vinyl chloride, from 10 to 50% of an alkyl acrylate in which the alkyl group contains a total of 8 to 10 carbon atoms and possesses a carbon chain of from 6 to 10 atoms, and from 5 to 30% by weight of isobutene.

2. A tripolymer made by polymerizing in aqueous emulsion a mixture of monomeric materials consisting of from 45 to 85% by weight of vinyl chloride, from 10 to 50% by weight of n-octyl acrylate, and from 5 to 30% by weight of isobutene.

3. A tripolymer made by polymerizing in aqueous emulsion a mixture of monomeric materials consisting of from 45 to 85% by weight of vinyl chloride, from 10 to 50% by weight of 2-ethylhexyl acrylate, and from 5 to 30% by weight of isobutene.

4. A tripolymer made by polymerizing in aqueous emulsion a mixture of monomeric materials consisting of from 45 to 85% by weight of vinyl chloride, from 10 to 50% by weight of 6-methlylheptyl acrylate, and from 5 to 30% by weight of isobutene.

5. A tripolymer made by polymerizing in aqueous emulsion a monomeric mixture consisting of 85% by weight of vinyl chloride, 10% by weight of 2-ethylhexyl acrylate, and 5% by weight of isobutylene.

ROBERT J. WOLF.

REFERENCES CITED

The following references are of record in the file of this patent:

UNITED STATES PATENTS

| Number | Name | Date |
|---|---|---|
| 2,462,422 | Plambeck | Feb. 22, 1949 |
| 2,510,426 | Smith | June 6, 1950 |

OTHER REFERENCES

Rehberg et al., article in Ind. Eng. Chem. August 1948, pages 1429–1433.